(No Model.)
H. W. SPRATT.
CUTTING APPARATUS.
No. 437,943. Patented Oct. 7, 1890.
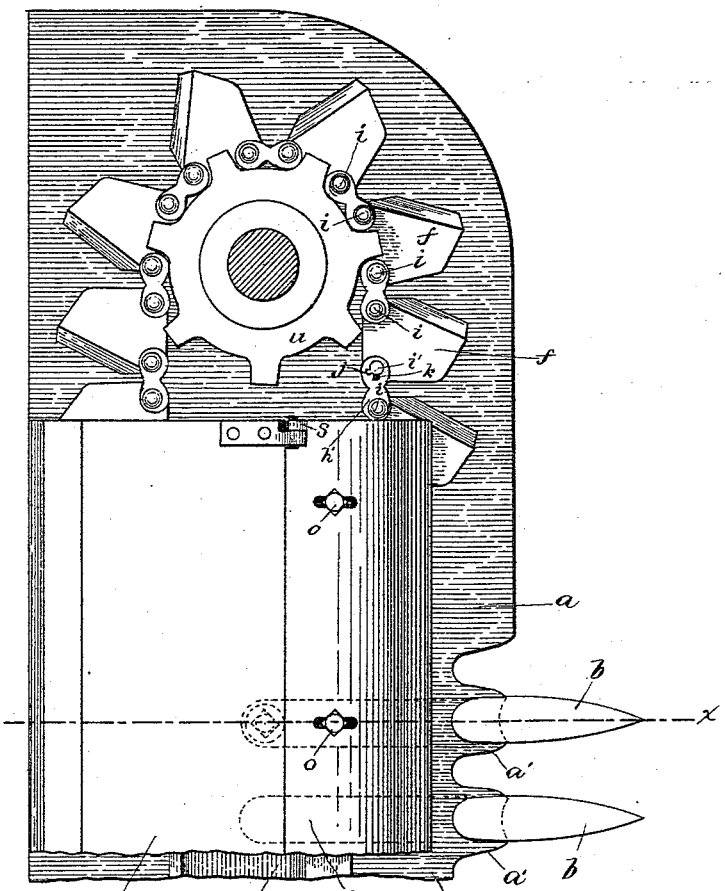
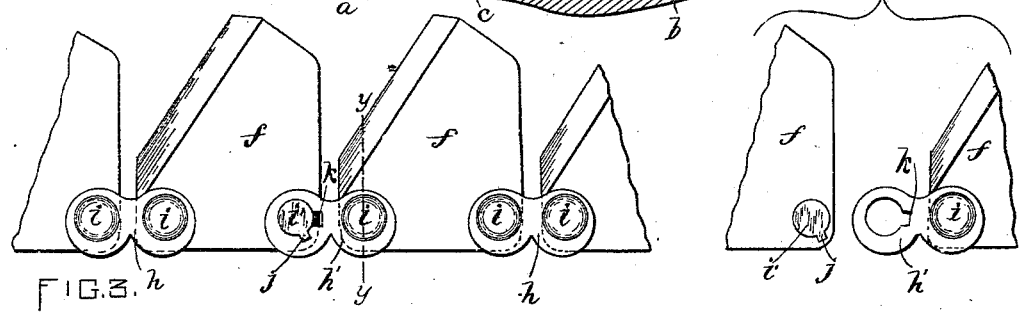
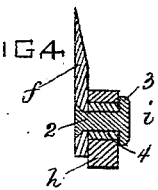
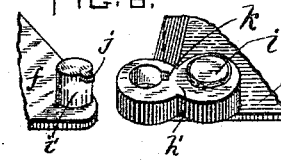
WITNESSES.  
INVENTOR.

UNITED STATES PATENT OFFICE.

HENRY W. SPRATT, OF BANGOR, MAINE, ASSIGNOR TO THE PERU MOWER COMPANY, OF PERU, INDIANA.

CUTTING APPARATUS.

SPECIFICATION forming part of Letters Patent No. 437,943, dated October 7, 1890.

Application filed September 17, 1888. Serial No. 285,623. (No model.)

*To all whom it may concern:*

Be it known that I, HENRY W. SPRATT, of Bangor, in the county of Penobscot and State of Maine, have invented certain new and useful Improvements in Cutting Apparatus for Mowing-Machines and Harvesters, of which the following is a specification.

This invention relates to cutting apparatus for mowing-machines employing an endless series of knives linked or pivoted together and driven by a sprocket-wheel to which the power of the machine is applied.

The invention consists in certain improved means for guiding and covering the knives, which I will now proceed to describe and claim.

Of the accompanying drawings, forming a part of this specification, Figure 1 represents a top view of the cutting apparatus of a mowing-machine of the class to which my improvements are applied. Fig. 2 represents a section on line $x\ x$, Fig. 1. Fig. 3 represents a top view of a part of the chain of knives. Fig. 4 represents a section on line $y\ y$, Fig. 3. Fig. 5 represents a top view of portions of two knives at the ends of adjacent gangs, said knives being separated. Fig. 6 represents a perspective view of the parts shown in Fig. 5.

The same letters of reference indicate the same parts in all the figures.

In the drawings, $a$ represents the finger-bar, which is preferably made of a single plate of saw-blade steel, having teeth $a'$ formed on its front edge, said teeth forming ledger-plates which co-operate with the knives, hereinafter described. Guard-fingers $b$ are secured to the finger-bar and interlocked with the teeth $a'$ thereof. A rigid rib $c$ is bolted to the upper side of the finger-bar and extends lengthwise thereof as a guide to the chain or series of knives.

The construction thus far described is not new with me, but is substantially shown in the patent to James O. Brown, No. 369,095, dated August 30, 1887.

$f\ f$ represent the knives, which are flexibly connected so as to form an endless chain, and are engaged by sprocket-wheels $u$ at the ends of the cutter-bar, one of said wheels being shown in Fig. 1.

My improvements may be described as follows: I connect each knife with the next by a link $h$, which has two sockets formed to receive headed studs or pins $i$, which are attached to the knives. Each stud $i$ is preferably composed of a rivet 2, having an enlarged head 3 at one end. A hardened-steel sleeve 4 is placed on the shank of the rivet. I permanently connect the rivets and links with the knives (excepting at the points where the chain or series is to be separable) by inserting the studs in the links, and the ends of the rivets in holes formed for the rivet-shanks in the knives, and then upsetting the inner ends of the rivet-shanks on the under surfaces of the knives, as shown in Fig. 4. Each link is thus pivotally connected with two knives, so that the chain as a whole is very flexible, and is therefore adapted to run easily on the sprocket-wheels. The steel sleeves make the pivotal connection durable and enable softer metal to be used for the bodies of the rivets than would otherwise be practicable.

The links are formed to project back of the knives, as shown in Figs. 1, 2, and 3, and thus prevent the backs of the knives from bearing against the guiding-rib $c$, the links themselves bearing on said rib and sustaining the wear resulting from the guiding action of the rib. I prefer to permanently connect six knives in the manner described, each six knives thus connected constituting a gang. The gangs are separably connected by means of a tongue $j$, formed on a stud $i'$ at one end of one gang, and a groove $k$, formed in one side of the socket of the link $h'$ permanently secured to the corresponding end of the other gang. The stud having the tongue $j$ is formed to enter the socket of the link $h'$ when the tongue $j$ is in position to coincide with the groove $k$, said tongue and groove being relatively arranged, as shown in Figs. 3 and 5, so that when the gangs are connected and the chain in operative position the tongue will be out of line with the groove and will project over the link $h'$, and thus prevent the separation of the stud $i'$ from it. When it is desired to remove a gang from the chain, the stud $i'$ and link $h'$ are turned to bring the tongue and groove into line, when the stud may be readily withdrawn from the link. It will be seen that by the described arrangement of the tongue $j$ and groove $k$ accidental separation of the gangs of knives is prevented, it being necessary to raise the link $h'$ from the stud $i'$ in order to separate one gang from another. Hence said separation cannot be caused by any horizontal movement of the chain.

The cover $g$ is secured by screws $o$ to the rib $c$ and projects forward from said rib, its forward portion being offset to form a shoulder $g'$, and to bring its forward edge down to the upper surfaces of the knives $f$. The shoulder $g'$ is formed to bear against the front sides of the links $h$, as shown in Fig. 2. Said shoulder and the front edge of the rib $c$ constitute a way in which the links $h$ are guided while the knives are cutting. The knives are thus prevented from yielding or swinging backwardly while cutting.

The cover $g$ may be adjustable vertically, so that its forward edge may bear upon the knives and hold them down upon the ledger plates or teeth $a'$, or may be raised to permit the knives to bear on the ledger-plates only by their own weight.

$r$ represents a cover for the rear portion of the chain of knives. Said cover, which is preferably of sheet metal, is connected by hinges $s$ with the cover $g$, so that it may be readily raised to expose the knives beneath it.

By reference to Fig. 1 it will be seen that the teeth of the sprocket-wheel $u$ enter the spaces between the links $h\ h'$, and thus impel the chain.

I claim—

In a cutting apparatus for mowing-machines, the combination of the finger-bar $a$, the ledger plates or teeth $a'$, the longitudinal rib $c$, rigidly connected to said finger-bar and having front and rear raised portions, the cover $g$, rigidly secured to said rib and having a lower vertical shoulder $g'$ parallel with said rib, the longitudinal cover $r$, hinged to said former cover and inclosing the rear portion of said rib, and the gang of knives having connecting-links designed to bear against the front and rear portions of said rib and against said vertical shoulder $g'$ and inclosed by said cover $r$, substantially as set forth, the lower edge of said shoulder being designed to bear upon the knives, as stated.

In testimony whereof I have signed my name to this specification, in the presence of three subscribing witnesses, this 22d day of May, A. D. 1888.

HENRY W. SPRATT.

Witnesses:
   J. S. H. TRINK,
   CHARLES E. BATCHELDER,
   T. E. O. MARVIN.